United States Patent [19]
Akazawa et al.

[11] 3,846,548
[45] Nov. 5, 1974

[54] AQUEOUS DOXYCYCLINE COMPOSITIONS

[75] Inventors: Yoshinobu Akazawa, Chitagun; Masami Yagyu, Nagoyashi; Shigenori Nozawa; Satoshi Yasui, both of Chitagun, all of Japan

[73] Assignee: Pfizer Inc., New York, N.Y.

[22] Filed: July 19, 1972

[21] Appl. No.: 273,208

[30] Foreign Application Priority Data
July 19, 1971   Japan.............................. 46-53146

[52] U.S. Cl. ................................................ 424/227
[51] Int. Cl. ............................................ A61k 21/00
[58] Field of Search .................................... 424/227

[56] References Cited
UNITED STATES PATENTS
3,389,175   6/1968   Nash et al........................... 424/227

OTHER PUBLICATIONS
Weidenheimer et al., Chem. Abst. Vol. 67 (1967) pg. 84868h.

*Primary Examiner*—Sam Rosen
*Attorney, Agent, or Firm*—Connolly and Hutz

[57]   ABSTRACT

A stable aqueous composition including doxycycline in water, a magnesium compound and a nonionic surface active agent, the doxycycline concentration being 20–40 mg/ml of the composition, the molar ratio of magnesium compound to doxycycline being 1:1 – 8:1, the concentration of the nonionic surface active agent being less than 20 percent w/v but not less than 7.5 percent w/v, the composition having a final pH of 5.0 to 7.0. The composition is suitable for pharmaceutical use and is especially useful for either oral, topical or parenteral administration.

3 Claims, No Drawings

AQUEOUS DOXYCYCLINE COMPOSITIONS

BACKGROUND OF THE INVENTION

Because of the therapeutic importance of the tetracycline-type antibiotics, efforts have been made to prepare compositions suitable for oral, topical or parenteral administration. Aqueous solutions of doxycycline can be prepared in the highly acid or alkaline pH range, but these solutions are found not to be suitable due to their high degree of instability and poor tolerance on topical application. On the other hand, aqueous solutions of oxytetracycline have been obtained which are suitable for therapeutic administration by simply dissolving the oxytetracycline in water containing polyvinylpyrrolidone together with an added magnesium compound at a pH range of 8.5–9.0 (e.g. see British Pat. No. 1,131,007). However, this process is not applicable to doxycycline solutions because of the relative instability of this compound in the alkaline pH range.

SUMMARY OF THE INVENTION

It has been found that stable aqueous solutions of doxycycline suitable for oral, topical or parenteral administration are provided by dissolving doxycycline and a magnesium compound in water containing a nonionic surface active agent and adjusting the pH of the aqueous antibiotic compositions to about 5.0 to 7.0.

DETAILED DESCRIPTION OF THE INVENTION

Doxycycline, the therapeutically-active component of the pharmaceutical compositions of this invention, is a tetracycline-type antibiotic of high potency, excellent absorption characteristics following oral or parenteral administration and biological half-life superior to other tetracycline antibiotics. It is described and claimed by R. K. Blackwood et al. in U.S. Pat. No. 3,200,149 under the chemical name, α-6-deoxy-5-oxytetracycline. An effective concentration range for doxycycline in the aqueous compositions of this invention is generally from about 20 to 40 mg/ml.

Magnesium ions react with doxycycline to form magnesium-doxycycline chelates. Magnesium chloride is a convenient source of magnesium ions but other magnesium compounds useful for the purposes of this invention include magnesium ascorbate, magnesium lactate, magnesium gluconate, etc. The molar ratio of magnesium to doxycycline in these compositions is one that is in the range of from about 1:1 to about 8:1 with the preferred ratio being from 1:1 to about 4:1.

In addition to the molar ratio of magnesium to doxycycline, the amount of solubilized doxycycline in the aqueous compositions of this invention is a function of surfactant concentration as shown in the following table:

| Surfactant Concentration (%) | Amount of Solubilized Doxycycline (mg/ml) | |
|---|---|---|
| | 2:1* | 8:1* |
| 5 | 15 | 30 |
| 10 | 30 | 60 |
| 15 | 45 | 90 |
| 20 | 60 | 120 |

*Molar ratio of magnesium to doxycycline

The preferred water-soluble surface active compounds are those having nonionic properties. Nonionic surface active agents are those surface active or detergent compounds which contain an organic hydrophobic group and a hydrophilic group which is a reaction product of a solubilizing group such as carboxylate, hydroxyl, amido or amino with ethylene oxide or with polyethylene glycol. A chemical classification scheme may be outlined as follows:

Nonionic - Compounds not ionizing when dissolved in water.
A. Polyethylene glycol fatty acid esters
B. Ethers
  1. Alkyl aryl polyether alcohols
  2. Polyoxalkylene derivatives of hexitol anhydride fatty acid esters.

The definite chemical description of each agent is possible only in a few cases since the majority are mixtures of closely related compounds depending upon the source of raw materials and the conditions of preparation.

Useful nonionic surfactants include aryl and alkyl phenols, fatty ethers such as lauryl ether, alkyl phenol ethers, amides of fatty acids such as lauramide, polyoxypropylene glycols of molecular weight 800–900, ethoxylated compounds such as ethoxylated oleolyl ethanolamide and ethoxylated linear primary alcohols and polyoxyethylene sorbitan fatty acid esters. These nonionic surface active agents are commercially available and sold under a wide variety of trademarks.

A number of polyoxyethylene hydrogenated castor oil derivatives are marketed under the Nikkol HCO series (Nikkol Chemicals Co., Ltd., Tokyo). Another suitable type of nonionic surface active agents are the partial esters of the common fatty acids (lauric, palmitic, stearic and oleic) and hexitol anhydrides derived from sorbitol. These compounds are all available commerically under the trademark name of "Tween" (Atlas Chemical Co., Wilmington, Delaware) or the generic term of polysorbate. For instance, polysorbate 60 is a polyoxyethylene sorbitan monostearate having approximately twenty oxyethylene units per molecule, while polysorbate 80 is the corresponding monooleate.

The nonionic surface active agent is incorporated in the aqueous doxycycline composition to a final concentration of less than 20 percent w/v, preferably in the range of 7.5 to 15 percent w/v.

In order to ensure the color and potency stabilities of the doxycycline solutions prepared in accordance with this invention, a suitable antioxidant is preferably added such as sodium or magnesium formaldehyde sulfoxylate (0.2–0.5 percent w/v); sodium sulfite, metabisulfite or bisulfite (0.1–0.2 percent w/v); sodium sulfide (0.002–0.004 percent w/v); α-monothioglycerol (0.4–1.0 percent w/v); and thiosorbitol (0.4–1.0 percent w/v).

Depending on the nature of the final pharmaceutical composition, the pH may be adjusted with a mineral acid such as hydrochloric acid or an organic acid such as citric acid, lactic acid, etc. For basic pH adjustment, suitable inorganic bases include ammonium or sodium hydroxide and organic bases such as aminomethane, dimethylaminomethanol, diethylaminoethanol, dimethylamine, diethylamine, trimethylamine, triethylamine, and preferably 2-aminoethanol. The pH of the aqueous doxycycline compositions are adjusted to between 5.0 and 7.0 until a clear solution is obtained.

This invention is illustrated by the following examples which are not to be construed in any way or manner as imposing limitations upon the scope thereof.

EXAMPLE I 2.56 g. of doxycycline hydrochloride, 1.85 g. of magnesium chloride hexahydrate and 0.4 g. of α-monothioglycerol are added to 80 ml. of 10 percent Nikkol HCO-60 solution with stirring. The pH of the suspension is adjusted with 2-aminoethanol until a clear solution is obtained (pH 5.0–5.5). The following table shows the blood levels in dogs, rabbits and humans following a single intramuscular dose of the aqueous doxycycline solution.

| Hours | Average Blood levels (mcg/ml) | | |
|---|---|---|---|
| | Dogs (5 mg/kg) | Rabbits (5 mg/kg) | Humans (100 mg/adult) |
| 1 | 2.3 | 1.5 | 1.2 |
| 3 | 4.3 | 2.3 | 1.5 |
| 6 | 4.1 | 3.0 | 1.5 |
| 24 | 2.3 | 1.0 | 0.8 |

EXAMPLE II 2.56 g. of doxycycline hydrochloride and 1.85 g. of magnesium chloride hexahydrate are added to 80 ml. of 7 percent polysorbate 80 solution under nitrogen. The pH is adjusted with a 2-aminoethanol to 5.5 to 6.0 until a clear solution is obtained. After the addition of 0.02 g. of magnesium formaldehyde sulfoxylate, the total volume is brought to 100 ml. with 7 percent polysorbate 80 solution. Blood levels are obtained comparable to those of Example I.

EXAMPLE III 2.56 of doxycycline hydrochloride, 1.85 g. of magnesium chloride hexahydrate and 0.2 g. of sodium metabisulfite are added to 80 ml. of 15 percent Nikkol HCO–40 solution, and the pH of the solution adjusted to 5.7 with 2-aminoethanol. The pH of the solution is adjusted to 5.5 with citric acid and the total volume is brought to 100 ml. with 15 percent Nikkol 50 solution. Blood levels are obtained comparable to those of Example I.

EXAMPLE IV 5.12 g. of doxycycline hydrochloride, 7.40 g. of magnesium chloride hexahydrate, 0.5 g. sodium sulfite and 15 g. Nikkol HCO–40 are dissolved in 80 ml. of water, the pH adjusted to between 5.0 and 7.0 with ammonium hydroxide until the solution is clear, and the total volume brought to 100 ml. with water.

EXAMPLE V 5.12 g. of doxycycline hydrochloride, 14.8 g. of magnesium chloride hexahydrate, 0.004 g. sodium sulfide and 20 g. of Nikkol HCO–50 are dissolved in about 80 ml. of water, the pH adjusted to between 5.0 and 6.7 with sodium hydroxide until the solution is clear, and the total volume brought to 100 ml. with water. Blood levels are obtained comparable to those of Example I.

EXAMPLE VI 2.2 g. of amphoteric doxycycline and 1.85 g. of magnesium chloride hexahydrate are added to 80 ml. of Nikkol HCO–80 solution with stirring. The pH of the suspension is adjusted with 2-aminoethanol to the range of 5.0 to 7.0 until the solution is clear. After the addition of 0.4 g. of thiosorbitol, the total volume is adjusted to 100 ml. with 10 percent Nikkol HCO–80 solution. Blood levels are obtained comparable to those of Example I.

EXAMPLE VII 2.44 g. of doxycycline sulfate and 1.85 g. of magnesium chloride hexahydrate are added to 80 ml. of 10 percent polysorbate 80 solution with stirring. The pH of the suspension is adjusted to 5.0 to 5.5 with 2-aminoethanol until a clear solution is obtained. After the addition of 0.02 g. of sodium metabisulfite, the total volume is adjusted to 100 ml. with 10 percent polysorbate solution.

EXAMPLE VIII 2.51 g. of doxycycline nitrate and 1.85 g. of magnesium chloride hexahydrate are added to 80 ml. of 10 percent polysorbate 80 solution. The pH of the solution is adjusted with 2-aminoethanol to 5.0 to 7.0 until a clear solution is obtained. After the addition of 0.02 g. of sodium metabisulfite, the total volume is adjusted to 100 ml. with 10 percent polysorbate 80 solution. Blood levels are obtained comparable to those of Example I.

What is claimed is:

1. A stable aqueous composition which comprises doxycycline; water; a magnesium compound selected from the group consisting of magnesium chloride, magnesium ascorbate, magnesium lactate and magnesium gluconate; and a nonionic surface active agent selected from the group consisting of a polyoxyethylene hydrogenated castor oil derivative and a polyoxyethylene derivative of a partial ester of lauric acid, palmitic acid, stearic acid, or oleic acid and a hexitol anhydride derived from sorbitol; the doxycycline concentration being about 20–40 mg/ml of said composition; the molar ratio of magnesium compound to doxycycline being about 1:1 – 8:1; the concentration of nonionic surface active agent being less than 20 percent but not less than 7.5 percent w/v; said composition having a final pH of 5.0 to 7.0.

2. The solution of claim 1 wherein said nonionic surface active agent is incorporated to a final concentration of 7.5 – 15 percent w/v.

3. The composition of claim 1 wherein said magnesium compound is magnesium chloride.

* * * * *